UNITED STATES PATENT OFFICE.

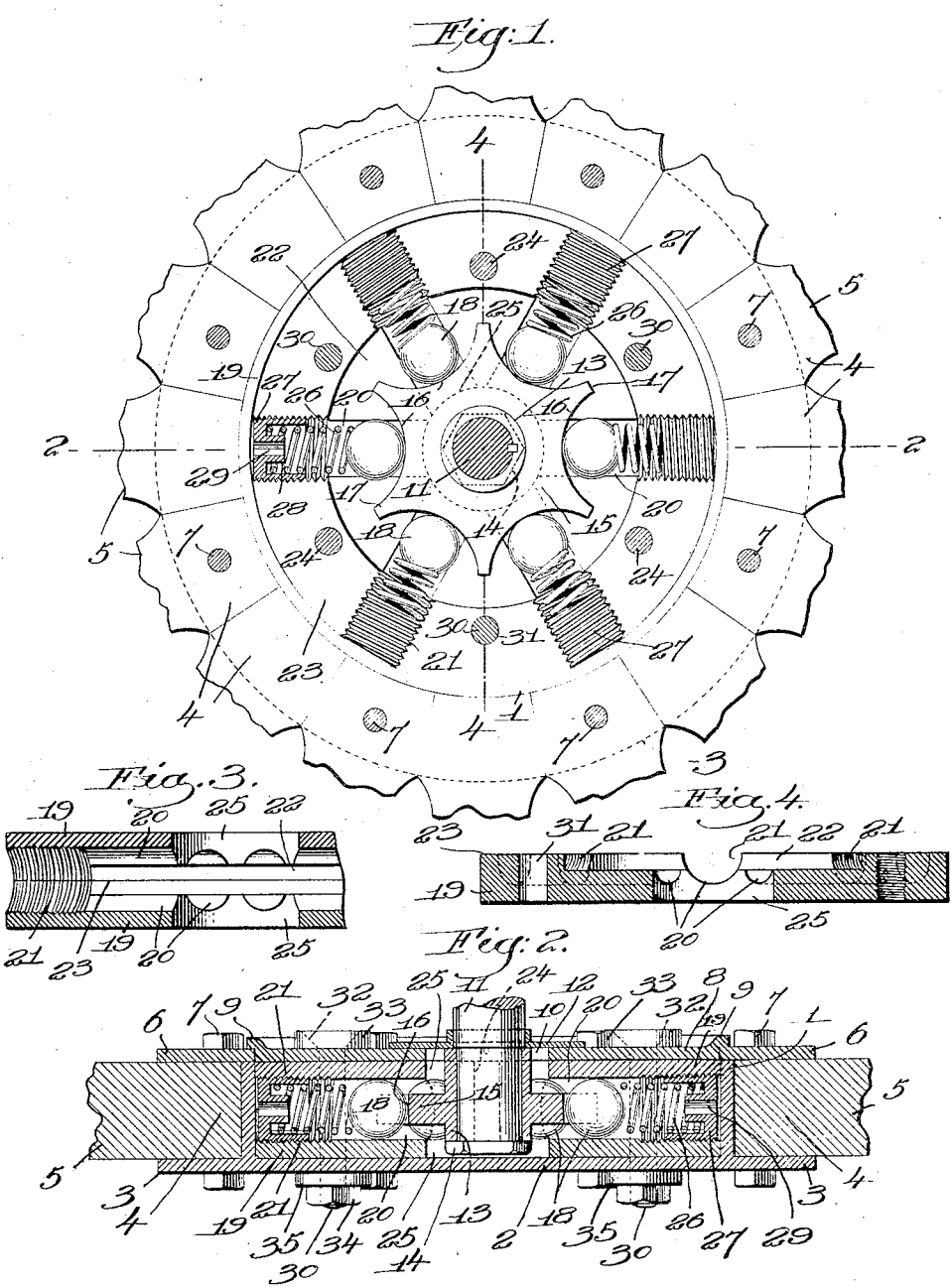

COURTLAND G. CAPWELL, OF ROSLINDALE, MASSACHUSETTS, ASSIGNOR OF THIRTY-SEVEN ONE-HUNDREDTHS TO FRED RAWITSER, OF SOUTH ACTON, MASSACHUSETTS, AND TWENTY-FIVE ONE-HUNDREDTHS TO JOHN H. MOORE, OF BOSTON, MASSACHUSETTS.

RESILIENT ANTIFRICTION-HUB FOR VEHICLE-WHEELS.

1,036,188.  Specification of Letters Patent.  Patented Aug. 20, 1912.

Application filed February 2, 1911. Serial No. 606,103.

*To all whom it may concern:*

Be it known that I, COURTLAND G. CAPWELL, a citizen of the United States, and resident of Roslindale, county of Suffolk, State of Massachusetts, have invented an Improvement in Resilient Antifriction-Hubs for Vehicle-Wheels, of which the following description, in connection with the accompanying drawing, is a specification, like characters on the drawing representing like parts.

This invention has for its object the production of a novel resilient hub particularly adapted for vehicle wheels, so constructed and arranged that the relative movements between the inner and outer members of the hub are attended with a minimum friction, and I have also provided novel yielding connecting means between the two hub members whereby the requisite resiliency of the wheel as a whole is provided without recourse to any form of cushion tire.

I have also constructed the hub in such manner that should any of its parts be damaged or broken the entire hub can be readily removed from its casing, permanently attached to the spokes and felly or rim of the wheel.

As will appear hereinafter the inner hub member is always concentric with the axle, while the outer complemental member of the hub is in practice rigidly connected with the felly and spokes of the wheel.

The various novel features of my invention will be fully described in the subjoined specification and particularly pointed out in the following claims.

Figure 1 is an inner side elevation and part section of a hub embodying my present invention, with the cap plate of the casing removed and also one of the halves of the outer member of the hub, the inner ends of the wheel spokes being shown butted against the peripheral wall of the casing; Fig. 2 is a transverse sectional view taken on the line 2—2, Fig. 1, but showing all of the parts of the hub assembled and mounted in the casing in readiness for use; Fig. 3 is a detail, partly in section on the line 2—2, of the assembled halves of the outer hub member, but omitting the inner hub member and the yielding, anti-friction connections between said members; Fig. 4 is a diametral sectional view of one of the halves of the outer hub member, on the line 4—4, Fig. 1.

Before describing the resilient hub the casing therefor will be described, and having special reference to Fig. 2 the casing is shown as a cylindrical metal box 1 having a closed bottom 2 which is extended adjacent its periphery to form an annular flange 3, the bottom of the casing in practice being at the outer side of the wheel, the butt ends 4 of the longitudinally rigid spokes 5 of the wheel being arranged around the periphery of the casing. At their outer ends the spokes are attached in any suitable manner to the wheel rim or felly, (not shown). A removable flat ring 6 seats on the open inner end of the casing and is held in place by suitable bolts 7 which pass through the ring, and the flange 4, and through some or all of the spoke butts.

By reference to Fig. 1 it will be seen that herein I provide for alternate spoke butts to be traversed by the bolts, the butts fitting tightly in the channel formed in the ring 6 and the flange 3. To all intents and purposes, therefore, the casing forms a permanent part of the wheel, and at the inner side of the wheel said casing is closed by a circular cap plate 8 having its periphery flanged at 9, see Fig. 2, to overlap the inner edge of the ring 6 and tightly close the casing at the joint, the cap plate having a central hole 10 for the passage of the axle 11. A metallic disk or washer 12 attached to the axle closes the opening 10 so that dirt and moisture cannot enter the casing, and retains in the latter grease or other viscous lubricant with which I prefer to pack the casing and the hub contained therein.

In the present embodiment of my invention the inner member of the hub, preferably made as a metal casting, comprises a tubular central hub portion 13 which receives and is keyed or otherwise fixed upon the axle 11 and held thereon by a retaining nut 14, Fig. 2, and as shown herein the tubular part 13 has a lateral web 15 having a series of peripheral concavities or seats 16 alternating with radial portions 17, six of the seats being shown in Fig. 1, symmetrically disposed with relation to the axis of the hub member. The seats are relatively deep compared with their length, the curvature of the seats being of short radius, radial lines from the center of the axle 11 intersecting the seats midway between their ends, the seats serving as abutments for antifriction members, herein shown as balls 18, and which are preferably made of hardened steel, said balls engaging tangentially and rolling lengthwise on the seats or abutments when the members of the hub move relatively.

The outer hub member is preferably made in like separable halves, and these halves are circular, metallic disks 19, each one having on its inner face a radial series of grooves constituting ball raceways 20, their outer ends communicating with screw-threaded semi-circular sockets 21. When the two halves or disks 19 are assembled face to face, each pair of semi-circular sockets 21 form a threaded hole having its outer end at the periphery of the hub member, but the inner face of each half 19 is circularly recessed at 22, Figs. 1 and 4, so that when the inner and outer members of the hub are assembled the abutment web 15 will fit easily between the parallel bottoms of the opposed circular recesses 22. Referring to Fig. 1 the face 23 of one of the halves 19 is the meeting face which abuts against the like face of the other half 19 when said halves are assembled, the face 23 being in the plane of separation of the halves, as will be manifest. The halves are fixedly connected by screws 24, set 120° apart, as shown in Fig. 1, the heads and ends of the screws being flush with the outer faces of the halves 19, the latter being assembled after the web 15 of the inner hub member has been positioned in the opposed recesses 22.

Opposite, central holes 25 in the halves 19 receive the ends of the tubular portion 13 of the inner hub, the holes being large enough to permit ample relative movement of the inner and outer hub members transversely to the axle 11.

The bearing balls 18 move easily in and longitudinally of the radial raceways 20, and said balls are yieldingly held against the concave abutments 16 by strong springs 26, the inner end of each spring engaging a ball and the outer end of the spring seating in a recessed and externally threaded plug 27 which is screwed into the socket 21. In Fig. 1 one of said plugs is shown in section, the others in elevation, and by screwing in said plugs the springs are compressed to the desired extent. To facilitate the adjustment of the plugs each one has a central, inwardly extended boss 28 having a polygonal hole 29 for the reception of a key or similar tool by means of which the plug is screwed in or out. In any case the outer ends of the plugs never extend beyond the periphery of the two-part outer hub member 19, 19, so that when the springs are set to the proper adjustment and the retaining nut 14 is screwed up on the axle 11 the outer hub member is seated in the casing 1, which it fits snugly, and the cap plate 8 is applied. The said plate, casing and outer hub member must be rigidly connected, and this I attain by bolts 30 which pass through holes 31 in the outer hub member, alternating with the screws 24, as most clearly shown in Fig. 1.

As the case and hub members are preferably packed with grease or some viscous lubricant it is very desirable that there shall be practically no leakage. This I provide for by making the heads 32, Fig. 2, of the bolts tapered to fit tightly in tapered seats in bosses 33 on the cap plate, and the nuts 34 have tapered inner faces to fit in correspondingly tapered seats in bosses 35 on the bottom 2 of the casing. When the nuts are set up they and the bolt heads are drawn so tightly into the bosses as to effectually prevent any leakage of lubricant. These bolts connect the outer hub member and the casing and hence the said hub member is rigidly connected with the non-resilient spokes and felly of the wheel.

In setting up the springs 26 they are so adjusted that when the inner and outer hub members are concentric the pressure will be equally exerted by all of the springs, tending to maintain the concentric relation of said members.

The springs and bearing balls constitute a yielding connection between the inner and outer hub members, as will be apparent, and when strains are imparted to either member one or more of the springs will be compressed as one member moves relatively to the other transversely to the axle, the strains thereby being taken up readily and gradually, so that shocks are absorbed and the wheel has the resilience which otherwise would be afforded by a cushion tire.

By reference to Fig. 1 it will be manifest that in any angular position of the wheel the load weight transmitted through axle 11 and abutments 16 will be sustained yieldingly by the coöperative action of at least two of the spring-sustained bearing balls and their corresponding back-stops or plugs 27 and thereby transferred to the outer hub member, shock and jar being taken up, equalized and distributed by the springs.

The bearing balls have a very small contact surface with the abutments 16 and said balls can roll or turn over in their movements longitudinally of the raceways 20, but it will be apparent that there can be no movement of said balls at right angles to the raceways. This is important in preventing improper relative rotative movement of the hub members, for when such movement occurs the concaved abutments slide upon the balls 18 and then press laterally against them, as the radial portions 17 are moved toward the balls, such lateral pressure being resisted by the balls and the side walls of the raceways 20.

By making the abutments rather sharply curved I prevent improper rotative movement of the hub members without any possibility of disengagement of a bearing ball and its abutment, the concave face of each abutment also preventing any chattering or undue vibration of the balls when the wheel is revolving, nor can the coöperating parts jam.

To remove the hub from the wheel the nuts 34 are unscrewed, releasing the bolts 31, and then the hub as a whole can be withdrawn from the casing 1, and by removing the retaining nut 14 said hub is readily detached from the axle. The hub itself can now be examined at leisure, and the inner and outer members thereof can be separated by removing the connecting screws 24.

Should a spring break or become otherwise damaged, or if it is desired to insert a new bearing ball, the proper back-stop or plug 27 is screwed out of its socket 21, when the spring and ball can be removed, and new ones substituted.

Relative axial movement of the inner and outer hub members is prevented by the opposed and parallel walls of the internal chamber formed by the opposed circular recesses 22 of the halves 19 of the outer hub member, for the abutment web 15 is held in such internal chamber between its opposite walls with only sufficient clearance to permit an easy sliding movement of the one part over the other.

The construction is simple, strong and durable, and the hub members can be made at a relatively low cost, said members and the castings being most conveniently made as castings, and whatever machine work is necessary can be done very readily.

Changes or modifications in various details of construction and arrangement may be made by those skilled in the art without departing from the spirit and scope of my invention as set forth in the claims hereunto annexed.

Having fully described my invention, what I claim as new and desire to secure by Letters Patent is:

1. In a device of the class described, the combination, with an inner hub member having an axle-receiving portion and a lateral web provided with peripheral and symmetrically disposed concave abutments, of an outer, two-part hub member having a circular chamber to receive said web, radial raceways in said member terminating at their outer ends in threaded sockets, back-stops screwed thereinto from the periphery of said outer member, anti-friction bearing members movable longitudinally in said raceways and coöperating each with a concave abutment, and a spring interposed between each bearing member and a back-stop, to maintain the bearing member in yielding engagement with its corresponding abutment.

2. In a device of the class described, the combination with an inner hub member adapted to be attached to an axle and having a lateral web provided with peripheral and symmetrically disposed concave abutments, of an outer hub member circularly chambered to receive said web and having radial raceways communicating with the chamber, bearing members radially movable within the raceways of said outer member, manually and adjustable means accessible at the outer ends of the raceways to maintain said bearing members in yielding engagement with their corresponding abutments, the sides of the raceways acting to guide and prevent non-radial movement of the bearing members, the concave abutments extending loosely into the inner ends of and crossing the raceways and thereby maintaining said bearing members at all times wholly within the raceways.

3. In a device of the class described, the combination with an inner hub member adapted to be attached to an axle and having a lateral web provided with peripheral and symmetrically disposed concave abutments, of a centrally open outer hub member internally chambered to receive the web and permit relative rotative and lateral movements of the hub members, said outer hub member having radial raceways communicating at their inner ends with the internal chamber, bearing balls movable longitudinally within said raceways and each coöperating with a concave abutment, the sides of the raceways serving to guide said balls radially of the outer hub member, the abutments entering loosely the inner ends of the raceways and maintaining the balls at all times wholly within the raceways, radially arranged springs carried by said member one in each raceway and at their inner ends engaging the balls and maintaining them yieldingly against the corresponding abutments, and a fixed back-stop for the outer end of each spring.

4. The combination, with an axle, and an inner hub member fixedly mounted thereon and having a lateral web provided with peripheral, symmetrically disposed and concave abutments, of an outer, centrally open hub member having connected spokes and internally chambered to receive and slidably confine the abutment, radial raceways in the chamber, terminating at their outer ends in threaded sockets located in the peripheral portion of said chambered member, bearing balls in the raceways, coöperating each with an abutment, a spring to yieldingly maintain each ball in engagement with its abutment, and externally accessible and adjustable plugs in the threaded sockets to serve as back-stops for and to vary the action of the springs.

5. In a device of the class described, the combination with an inner hub member adapted to be attached to an axle and having a lateral web provided with peripheral and symmetrically disposed concave abutments, of an outer hub member adapted to be fixedly connected with the spokes of a wheel and internally chambered to receive the abutment web, radial grooves in the walls of the chamber, to constitute raceways, a threaded socket in the unchambered portion of the outer hub member, at the outer end of and alined with each raceway, a bearing ball radially movable in each raceway, a plug screwed into each socket and having a spring seat in its inner end, and a coiled spring interposed between each plug and the ball in the corresponding raceway, to yieldingly press the ball against one of the concave abutments.

6. In a device of the class described, the combination with an inner hub member adapted to be attached to an axle and having a lateral web provided with peripheral and symmetrically disposed concave abutments, each abutment having a curvature of short radius, of an outer hub member internally and centrally chambered to receive the web and permit limited lateral and rotative movement thereof and having radial raceways communicating with the chamber, bearing balls movable longitudinally within the raceways and coöperating with the abutments, yielding means in each raceway to maintain the balls in engagement with the abutments, the raceways serving to permit radial movement of said balls while preventing movement thereof at right angles to radii, the abutments extending loosely into the inner ends of the raceways and crossing the same and maintaining the balls wholly within the raceways at all times, relative rotative movement of the hub members being limited by coöperation of the side portions of the abutments with the corresponding balls, and a plug in the outer end of each raceway engaging the yielding means therein.

7. The combination with a cylindrical casing permanently closed at its bottom and having attached spokes, and a detachable cover plate centrally apertured for the reception of the axle and the inner hub member, of inner and outer hub members, the former having a series of symmetrically disposed concave abutments and adapted to be mounted fixedly on the hub, said outer member fitting snugly and removably in the casing and internally chambered for the reception of the abutments, radially disposed, yielding connections between the inner and outer hub members and coöperating with the concave abutments, headed bolts extended through the cover plate, casing bottom, and outer hub member, to fixedly connect said parts in operative relation, nuts to tighten said bolts, and means on the cover plate and casing bottom to coöperate with the bolt-heads and the nuts to prevent leakage of lubricant from the casing and contained hub members.

In testimony whereof, I have signed my name to this specification, in the presence of two subscribing witnesses.

COURTLAND G. CAPWELL.

Witnesses:
 JOHN C. EDWARDS,
 THOMAS J. DRUMMOND.